(12) United States Patent
Andersson et al.

(10) Patent No.: US 9,680,521 B2
(45) Date of Patent: *Jun. 13, 2017

(54) TRANSCEIVER FRONT-END FOR BLOCKING TRANSMIT OR RECEIVE FREQUENCY SIGNALS

(75) Inventors: Stefan Andersson, Lund (SE); Imad ud Din, Lund (SE); Henrik Sjöland, Lund (SE); Tobias Tired, Lund (SE); Johan Wernehag, Malmö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 190 days.

This patent is subject to a terminal disclaimer.

(21) Appl. No.: 14/413,293

(22) PCT Filed: Jul. 9, 2012

(86) PCT No.: PCT/EP2012/063431
§ 371 (c)(1),
(2), (4) Date: Apr. 16, 2015

(87) PCT Pub. No.: WO2014/008921
PCT Pub. Date: Jan. 16, 2014

(65) Prior Publication Data
US 2015/0222321 A1    Aug. 6, 2015

(51) Int. Cl.
*H04B 1/38* (2015.01)
*H04B 1/525* (2015.01)
*H04L 5/14* (2006.01)

(52) U.S. Cl.
CPC ............. *H04B 1/525* (2013.01); *H04L 5/14* (2013.01)

(58) Field of Classification Search
CPC .. H04B 1/525; H04B 2203/5491; H04B 1/48; H04B 2001/485; H04L 5/14
See application file for complete search history.

(56) References Cited

U.S. PATENT DOCUMENTS 7,809,349 B1    10/2010    Granger-Jones et al.
2003/0128081 A1    7/2003    Ella et al.
(Continued)

FOREIGN PATENT DOCUMENTS

EP    2393211 A3    3/2012

OTHER PUBLICATIONS

Mirzaei, A., et al., "A Low-Power Process-Scalable Superheterodyne Receiver with Integrated High-Q Filters", 2011 IEEE International Solid-State Circuits Conference, Session 3, Feb. 21, 2011, pp. 60-61 and Paper continuation (p. 1), IEEE.
(Continued)

*Primary Examiner* — Golam Sorowar
(74) *Attorney, Agent, or Firm* — Coats & Bennett, P.L.L.C.

(57) ABSTRACT

A transceiver front-end is connectable to a signal transmission and reception arrangement adapted to transmit and receive with respective frequencies. The transceiver front-end comprises at least one of a transmit frequency blocking arrangement and a receive frequency blocking arrangement. For instance, the transmit frequency blocking arrangement has a blocking and non-blocking frequency interval associated with the transmit frequency and receive frequency, respectively, and is adapted to block passage of transmit frequency signals between the signal transmission and reception arrangement and the receiver. At least one of the transmit frequency blocking arrangement and the receive frequency blocking arrangement comprises a network of passive components comprising at least one transformer and a frequency translated impedance adapted to have a higher impedance value in the blocking frequency interval than in the non-blocking frequency interval.

25 Claims, 5 Drawing Sheets

(56) References Cited

U.S. PATENT DOCUMENTS

| | | |
|---|---|---|
| 2004/0151302 A1 | 8/2004 | Sabouri et al. |
| 2006/0135084 A1 | 6/2006 | Lee |
| 2008/0175307 A1* | 7/2008 | Brunn ............... H04B 1/1036 375/148 |
| 2008/0279262 A1 | 11/2008 | Shanjani |
| 2010/0109800 A1 | 5/2010 | Ueda et al. |
| 2011/0064004 A1 | 3/2011 | Mikhemar et al. |
| 2011/0158134 A1* | 6/2011 | Mikhemar ............ H03H 11/42 370/277 |
| 2011/0299433 A1* | 12/2011 | Darabi ................ H04B 1/525 370/277 |
| 2011/0299438 A1 | 12/2011 | Mikhemar et al. |
| 2011/0299576 A1 | 12/2011 | Mikhemar et al. |
| 2011/0300813 A1 | 12/2011 | Mirzaei et al. |
| 2011/0300885 A1* | 12/2011 | Darabi ................. H04B 1/52 455/500 |
| 2013/0077540 A1 | 3/2013 | Black et al. |

OTHER PUBLICATIONS

Mirzaei, A., et al., "65 nm CMOS Quad-band SAW-Less Receiver SoC for GSM/GPRS/EDGE", IEEE Journal of Solid-State Circuits, Apr. 1, 2011, pp. 950-964, vol. 46, No. 4, IEEE.

* cited by examiner

TRANSCEIVER FRONT-END FOR BLOCKING TRANSMIT OR RECEIVE FREQUENCY SIGNALS

TECHNICAL FIELD

The present invention relates generally to the field of transceiver front-ends for communication devices. More particularly, it relates to transceiver front-ends providing isolation between a transmitter and a receiver.

BACKGROUND

In transceivers for frequency division duplex (FDD) communication (e.g. a transceiver of a cellular radio equipment), the receiver typically experience strong interference signals from the transmitter of the same transceiver.

The interference signal from the transmitter has a carrier frequency at duplex distance from the carrier frequency of the receive signal. A typical duplex distance is small compared to the carrier frequencies. Typically, the duplex distance may be less than 100 MHz while the carrier frequencies may, for example, be somewhere between 700 MHz and 3 GHz.

To be able to operate with required performance (e.g. achieving good sensitivity), the receiver should preferably be shielded (or isolated) from the interference from the transmitter of the transceiver, both from transmitter signals at transmit frequency and transmitter generated interference at receive frequency. It is also desirable that the transmitter is shielded (or isolated) from the received signals. Example reasons include that as much of the received energy as possible should be transferred to the receiver for optimal receiver performance and that received signals occurring at the transmitter output may cause interference to the signal to be transmitted.

Such isolation is typically achieved by off-chip acoustic wave duplex filters (duplexers). A drawback with duplexers is that they are typically expensive. They are also bulky which increases the size of a transceiver implementation. Duplexers are also fixed in frequency, which necessitates several duplexers to be used if several frequency bands are to be supported. These problems are becoming more pronounced as the number of frequency bands to be supported by a communication device is increased.

Therefore, there is a need for integrated solutions that provide isolation between a transmitter and a receiver.

A typical on-chip isolation implementation is based on cancellation of the interferer signal. To achieve perfect cancellation of transmit signals at the receiver input symmetry is necessary, and the circuit requires a dummy load that equals the antenna impedance both at the receive frequency and at the transmit frequency. If the antenna impedance is complex (inductive or capacitive) and/or varies over time (e.g. due to frequency changes and/or changing antenna surroundings), implementation of a perfect cancellation becomes cumbersome. Furthermore, at least 3 dB of the power of receive and transmit signals will be lost in the dummy load.

US 2011/0064004 A1 discloses an radio frequency (RF) front-end comprising a power amplifier (PA), a noise-matched low-noise amplifier (LNA), a balance network, and a four-port isolation module. The isolation module isolates the third port from the fourth port to prevent strong outbound signals received at the third port from saturating the LNA coupled to the fourth port. Isolation is achieved via electrical balance.

Similarly as described above, a drawback of this solution is that the balance network needs to track impedance changes in the antenna during operation to enable sufficient isolation. The impedance needs to be tracked at both receive frequency and transmit frequency simultaneously. Thus, the implementation is sensitive and complex. A further drawback of this solution is that at least 3 dB of the power of receive and transmit signals will be lost due to the matched impedance of the balance network.

Therefore, there is a need for alternative and improved integrated solutions that provide isolation between a transmitter and a receiver.

SUMMARY

It should be emphasized that the term "comprises/comprising" when used in this specification is taken to specify the presence of stated features, integers, steps, or components, but does not preclude the presence or addition of one or more other features, integers, steps, components, or groups thereof.

It is an object of some embodiments to obviate at least some of the above disadvantages and to provide improved integrated solutions that provide isolation between a transmitter and a receiver.

According to a first aspect, this is achieved by a transceiver front-end of a communication device. The communication device may be a wireless or wired communication device.

According to the first aspect, the transceiver front-end is connectable, at a signal transmission and reception arrangement node, to a signal transmission and reception arrangement adapted to transmit a transmit signal having a transmit frequency and to receive a receive signal having a receive frequency. Examples of signal transmission and reception arrangements include an antenna, a group of antennas, and a cable.

The transceiver front-end is also connectable, at one or more transmitter nodes, to a transmitter adapted to produce the transmit signal, and, at one or more receiver nodes, to a receiver adapted to process the receive signal.

The transceiver front-end comprises one or both of a transmit frequency blocking arrangement and a receive frequency blocking arrangement.

If the transceiver front-end comprises a transmit frequency blocking arrangement it is connected to the signal transmission and reception arrangement node and at least one of the receiver nodes. The transmit frequency blocking arrangement has a blocking frequency interval associated with the transmit frequency and a non-blocking frequency interval associated with the receive frequency, and is adapted to block passage of transmit frequency signals between the signal transmission and reception arrangement and the receiver. The transmit frequency may be comprised in the blocking frequency interval and the receive frequency may be comprised in the non-blocking frequency interval.

If the transceiver front-end comprises a receive frequency blocking arrangement it is connected to the signal transmission and reception arrangement node and at least one of the transmitter nodes. The receive frequency blocking arrangement has a blocking frequency interval associated with the receive frequency and a non-blocking frequency interval associated with the transmit frequency, and is adapted to block passage of receive frequency signals between the signal transmission and reception arrangement and the transmitter. The receive frequency may be comprised in the blocking frequency interval and the transmit frequency may be comprised in the non-blocking frequency interval.

Thus, the transmitter is connectable to the signal transmission and reception arrangement node via the receive frequency blocking arrangement and the receiver is connectable to the signal transmission and reception arrangement node via the transmit frequency blocking arrangement.

At least one of the transmit frequency blocking arrangement and the receive frequency blocking arrangement comprises a network of passive components comprising at least one transformer and a frequency translated impedance adapted to have a higher impedance value in the blocking frequency interval than in the non-blocking frequency interval.

In some embodiments, both of the transmit frequency blocking arrangement and the receive frequency blocking arrangement comprise a network of passive components and a frequency translated impedance. In other embodiments, one of the transmit frequency blocking arrangement and the receive frequency blocking arrangement comprises another structure, which may, for example, be comprised in the transceiver front-end or implemented as a separate module. Examples of other structures include a capacitance-inductance network, and an arrangement with a bank of surface acoustic wave (SAW) filters and an antenna switch. Other examples of structures include an arrangement with a network of passive components and a frequency selective filter.

In some embodiments, the frequency translated impedance may comprise a frequency selective impedance, a clock signal provider adapted to provide a clock signal, and a mixer adapted to translate the frequency selective impedance by mixing it with the clock signal. The clock signal provider may be a clock signal source such as a clock signal generator, or the clock signal provider may be a clock signal input port of the frequency translated impedance. Thus, a clock signal generator may or may not be comprised in the frequency translated impedance. The mixer may comprise a single mixer or a set of mixers (e.g. an IQ-mixer—in-phase/quadrature mixer). In some embodiments, the clock signal may be a 4-phase IQ-signal and the mixer may be an IQ-mixer.

The frequency translated impedance of the receive frequency blocking arrangement may be adapted to have a higher impedance value at the receive frequency than at the transmit frequency. The frequency translated impedance of the transmit frequency blocking arrangement may be adapted to have a higher impedance value at the transmit frequency than at the receive frequency.

According to some embodiments, the signal transmission and reception arrangement node is connected to a first node of a first side of the transformer of the receive frequency blocking arrangement, the frequency translated impedance of the receive frequency blocking arrangement is a first frequency translated impedance and is connected to a second node of the first side of the transformer of the receive frequency blocking arrangement, and a first node of the one or more transmitter nodes is connected to a first node of the second side of the transformer of the receive frequency blocking arrangement.

The receive frequency blocking arrangement may comprise a second frequency translated impedance connected to the first node of the second side of the transformer of the receive frequency blocking arrangement according to some embodiments.

The second node of the second side of the transformer of the receive frequency blocking arrangement may be connected to one or more of a third frequency translated impedance and a second node of the one or more transmitter nodes. Alternatively, the second node of the second side of the transformer of the receive frequency blocking arrangement may be connected to ground.

In some embodiments, the frequency selective impedance of the receive frequency blocking arrangement may be an impedance having higher impedance value at frequencies not exceeding a first threshold than at frequencies exceeding the first threshold and the clock signal may have the receive frequency.

In some embodiments, the frequency selective impedance of the receive frequency blocking arrangement may be an impedance having higher impedance value at frequencies exceeding a second threshold than at frequencies not exceeding the second threshold and the clock signal may have the transmit frequency.

In some embodiments, the frequency selective impedance of the receive frequency blocking arrangement may be an impedance having higher impedance value at frequencies in a first interval than at frequencies not in the first interval and the clock signal may have the transmit frequency.

According to some embodiments, the signal transmission and reception arrangement node is connected to a first node of a first side of the transformer of the transmit frequency blocking arrangement, the frequency translated impedance of the transmit frequency blocking arrangement is a fourth frequency translated impedance and is connected to a second node of the first side of the transformer of the transmit frequency blocking arrangement, and a first node of the one or more receiver nodes is connected to a first node of the second side of the transformer of the transmit frequency blocking arrangement.

The transmit frequency blocking arrangement may comprise a fifth frequency translated impedance connected to the first node of the second side of the transformer of the transmit frequency blocking arrangement according to some embodiments.

The second node of the second side of the transformer of the transmit frequency blocking arrangement may be connected to one or more of a sixth frequency translated impedance and a second node of the one or more receiver nodes. Alternatively, the second node of the second side of the transformer of the transmit frequency blocking arrangement may be connected to ground.

In some embodiments, the frequency selective impedance of the transmit frequency blocking arrangement may be an impedance having higher impedance value at frequencies not exceeding a third threshold than at frequencies exceeding the third threshold and the clock signal may have the transmit frequency.

In some embodiments, the frequency selective impedance of the transmit frequency blocking arrangement may be an impedance having higher impedance value at frequencies exceeding a fourth threshold than at frequencies not exceeding the fourth threshold and the clock signal may have the receive frequency.

In some embodiments, the frequency selective impedance of the transmit frequency blocking arrangement may be an impedance having higher impedance value at frequencies in a second interval than at frequencies not in the second interval and the clock signal may have the receive frequency.

In some embodiments the transmit frequency blocking arrangement may comprise another structure such as a capacitance-inductance network as mentioned above. In one of these embodiments, the transmit frequency blocking arrangement may comprise a first inductance connected between the signal transmission and reception arrangement node and the receive frequency blocking arrangement, a capacitance connected to the signal transmission and reception arrangement node at a first node and adapted to form a matching network (e.g. an L-matched network) for transmit signals with the first inductance, and a second inductance connected between a second node of the capacitance and a first node of the one or more receiver nodes and adapted to form a series resonance circuit for receive signals with the capacitance. The transmit frequency blocking arrangement may also comprise a frequency translated impedance connected to the second node of the capacitance and comprising a frequency selective impedance having higher impedance value at frequencies not exceeding a fifth threshold than at frequencies exceeding the fifth threshold, a clock signal provider adapted to provide a clock signal having the receive frequency and a mixer adapted to translate the frequency selective impedance by mixing it with the clock signal.

A second aspect is a transceiver comprising the transceiver front-end of the first aspect, the transmitter and the receiver. The transceiver comprises the transmit frequency blocking arrangement and the receive frequency blocking arrangement, either as part of the transceiver front-end or one or more separate components (if the transceiver front-end only comprises one of them). The transceiver may further comprise the signal transmission and reception arrangement.

A third aspect is a (wireless or wired) communication device comprising the transceiver of the second aspect.

According to a fourth aspect, a method is provided of blocking transmit frequency signals from passage between a signal transmission and reception arrangement and a receiver of a communication device. The method comprises constructing a frequency translated impedance comprising a frequency selective impedance, a mixer and a clock signal provider, wherein the frequency translated impedance has a higher impedance value at the transmit frequency than at the receive frequency. The method further comprises connecting the signal transmission and reception arrangement to a first node of a first side of a transformer and the receiver to a first node of a second side of the transformer, and connecting the frequency translated impedance to a second node of the first side of the transformer.

According to a fifth aspect, a method is provided of blocking receive frequency signals from passage between a signal transmission and reception arrangement and a transmitter of a communication device. The method comprises constructing a frequency translated impedance comprising a frequency selective impedance, a mixer and a clock signal provider, wherein the frequency translated impedance has a higher impedance value at the receive frequency than at the transmit frequency. The method further comprises connecting the signal transmission and reception arrangement to a first node of a first side of a transformer and the transmitter to a first node of a second side of the transformer, and connecting the frequency translated impedance to a second node of the first side of the transformer.

In some embodiments, the second, third, fourth and fifth aspects may additionally have features identical with or corresponding to any of the various features as explained above for the first aspect.

An advantage of some embodiments is that a possibility to implement an integrated solution for isolation between a transmitter and a receiver is provided.

Another advantage of some embodiments is that power loss due to a dummy load is avoided.

A further advantage with some embodiments is that matching of a dummy load to antenna impedance is avoided.

Yet a further advantage with some embodiments is that tracking of changing antenna impedance is not necessary.

Some embodiments provide solutions for isolation between a transmitter and a receiver that are simple and area efficient (e.g. two transformers and two frequency translated impedances). Furthermore, the solutions according to some embodiments provide isolation while having low power consumption.

The isolation solutions provided by some embodiments are easily tunable due to the frequency translated impedance structure (changing the clock frequency fed to the mixer will tune the blocking arrangement to a desired frequency range).

BRIEF DESCRIPTION OF THE DRAWINGS

Further objects, features and advantages will appear from the following detailed description of embodiments, with reference being made to the accompanying drawings, in which.

DETAILED DESCRIPTION

In the following, embodiments will be described where transceiver structures are provided comprising a receiver, a transmitter, a signal transmission and reception arrangement (e.g. an antenna), a transmit frequency blocking arrangement and a receive frequency blocking arrangement.

The transmitter is connectable to the signal transmission and reception arrangement node via the receive frequency blocking arrangement and the receiver is connectable to the signal transmission and reception arrangement node via the transmit frequency blocking arrangement.

The transmit frequency blocking arrangement is adapted to block passage of transmit frequency signals between the signal transmission and reception arrangement and the receiver.

Blocking of transmit frequency signals may be achieved by the transmit frequency blocking arrangement having a blocking frequency interval associated with the transmit frequency and a non-blocking frequency interval associated with the receive frequency. The blocking frequency interval may be a frequency interval comprising the transmit frequency and the non-blocking frequency interval may be a frequency interval comprising the receive frequency. The frequency intervals may, for example, be broad band or narrow band. The frequency intervals may, for example, comprise all frequencies below a cut-off frequency or all frequencies of interest above a cut-off frequency.

Similarly, the receive frequency blocking arrangement is adapted to block passage of receive frequency signals between the signal transmission and reception arrangement and the transmitter.

Blocking of receive frequency signals may be achieved by the receive frequency blocking arrangement having a blocking frequency interval associated with the receive frequency and a non-blocking frequency interval associated with the transmit frequency. The blocking frequency interval may be a frequency interval comprising the receive frequency and the non-blocking frequency interval may be a frequency interval comprising the transmit frequency. The frequency intervals may, for example, be broad band or narrow band. The frequency intervals may, for example, comprise all frequencies below a cut-off frequency or all frequencies of interest above a cut-off frequency.

Embodiments described herein provide an active isolator/duplexer between a transmitter and a receiver. The isolator comprises the transmit frequency blocking arrangement and the receive frequency blocking arrangement and is tunable by way of frequency translated impedances comprising a frequency selective impedance and a mixer adapted to translate the frequency selective impedance by mixing it with a clock signal. Changing the clock signal frequency provides tuning of the isolator. The possibility to tune the frequency translated impedances to any desirable frequency provides for a possibility to have an integrated (on-chip) implementation of narrowband (high Q-value) frequency selective impedance, and a single (or very few) implementation may suffice for covering all relevant frequencies.

Even though many embodiments herein are particularly suitable for integrated implementation, the isolator may equivalently be implemented—partly or fully—off-chip (e.g. using discrete components).

Figure 1:
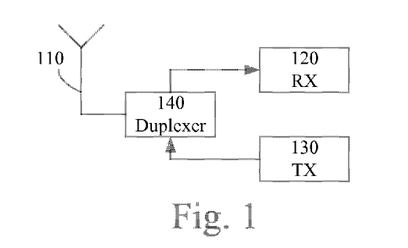
FIG. 1 is a schematic drawing illustrating a prior art transceiver arrangement.

FIG. 1 illustrates a typical transceiver arrangement according to the prior art. The typical transceiver comprises a receiver (RX) 120, a transmitter (TX) 130, an antenna 110 and a duplexer 140 implemented as a separate module. The duplexer provides isolation between the transmitter and the receiver. As mentioned before, such a duplexer implementation is typically expensive and large.

Figure 2:
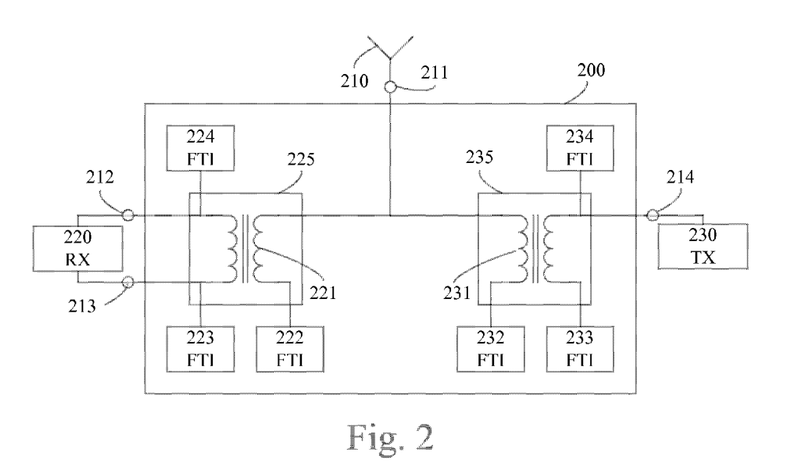
FIG. 2 is a schematic drawing illustrating an example transceiver arrangement according to some embodiments.

FIG. 2 illustrates an example of an alternative transceiver arrangement according to some embodiments. The transceiver arrangement of FIG. 2 comprises a receiver (RX) 220, a transmitter (TX) 230, an antenna 210 and a transceiver front-end 200. The antenna is connected to an antenna node 211 of the transceiver front-end, the transmitter is connected to a transmitter node 214 of the transceiver front-end, and the receiver is connected to two receiver nodes 212, 213 of the transceiver front-end (i.e. the receiver has a differential input). In other embodiments, the transmitter may be connected to two transmitter nodes of the transceiver front-end (i.e. differential transmitter output) and/or the receiver may be connected to one receiver node of the transceiver front-end.

The transceiver front-end 200 comprises a transmit frequency blocking arrangement and a receive frequency blocking arrangement.

The transmit frequency blocking arrangement comprises a network of passive components 225 comprising at least one transformer 221. In this example, the network of passive components consists of the transformer 221 only, but in other examples more components may be present. For example, the network of passive components could comprise a passive filter without frequency translation, such as a parallel or series LC-circuit. In some embodiments, the network of passive components may comprise a transformer where the two windings have opposite phase and a coupler connected between the first node of the first side of the transformer and the first node of the second side of the transformer and adapted to cancel a remaining signal at the blocking frequency interval.

The coupler may comprise first and second resistances connected in series between the first node of the first side of the transformer and the first node of the second side of the transformer via a mid point node. The coupler may also comprise a third capacitance connected between the mid point node and ground. The resistances may or may not be matched. In some embodiments, the coupler further comprises a third inductance connected in parallel with the third capacitance. The third capacitance and the third inductance provides for a possibility to tune the phase of the coupling between the transformer sides so that the remaining signal is properly canceled.

The transmit frequency blocking arrangement also comprises at least one frequency translated impedance (FTI) 222, 223, 224 adapted to have a higher impedance value in a transmit frequency blocking interval (e.g. a frequency interval comprising the transmit frequency) than in a non-blocking frequency interval.

The receive frequency blocking arrangement comprises a network of passive components 235 comprising at least one transformer 231. In this example, the network of passive components consists of the transformer 231 only, but in other examples more components may be present in a similar manner as described above for the transmit frequency blocking arrangement. The receive frequency blocking arrangement also comprises at least one frequency translated impedance (FTI) 232, 233, 234 adapted to have a higher impedance value in a receive frequency blocking interval (e.g. a frequency interval comprising the receive frequency) than in a non-blocking frequency interval.

Typically, a high impedance value may comprise a value that is higher than the antenna impedance.

The signal transmission and reception arrangement node 211 is connected to a first node of a first side of the transformer 221 of the transmit frequency blocking arrangement and to a first node of a first side of the transformer 231 of the receive frequency blocking arrangement.

The frequency translated impedances 222 and 232 are connected to a second node of the first side of the respective transformer 221, 231, the frequency translated impedances 224 and 234 are connected to a first node of the second side of the respective transformer 221, 231, and the frequency translated impedances 223 and 233 are connected to a second node of the second side of the respective transformer 221, 231. Various implementations may employ one or more of the FTIs 222, 223 and 224 and one or more of the FTIs 232, 233 and 234.

The transmitter node 214 is connected to the first node of the second side of the transformer of the receive frequency blocking arrangement, and the receiver node 212 is connected to the first node of the second side of the transformer of the transmit frequency blocking arrangement. In this example, the receiver has a differential input and two receiver nodes. The receiver node 213 is connected to the second node of the second side of the transformer of the transmit frequency blocking arrangement. As mentioned before the transmitter may also have a differential structure and/or the receiver may have a non-differential (single-ended) structure.

Figure 3A:
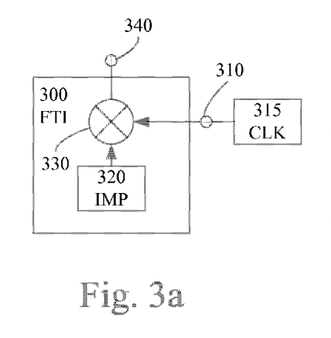
FIGS. 3a and 3b are schematic drawings illustrating example frequency translated impedances according to some embodiments.

FIG. 3a illustrates an example of a frequency translated impedance (FTI) 300 according to some embodiments. In this example, the FTI comprises a frequency selective impedance 320 having different values at different frequencies (e.g. a capacitance connected in series to ground may have a higher impedance value at low frequencies than at high frequencies), a clock signal provider in the form of a clock signal input port 310, a mixer 330 and a connection node 340.

The impedance 320 typically has higher impedance in one frequency interval than at other frequencies. For example, the impedance may have higher impedance value at frequencies not exceeding a threshold than at frequencies exceeding the threshold (hereafter referred to as low frequency high value impedance). Alternatively, the impedance may have higher impedance value at frequencies exceeding threshold than at frequencies not exceeding the threshold (hereafter referred to as high frequency high value impedance). Yet alternatively, the impedance may have higher impedance value at frequencies in a frequency interval than at frequencies not in the interval (hereafter referred to as band frequency high value impedance). The thresholds may or may not be equal, and are typically—but not necessarily—related to the duplex distance (e.g. threshold value equals half the duplex distance).

The clock signal provider 310 may be a clock signal input port connected to a clock signal source 315 as illustrated in FIG. 3a. Alternatively, the clock signal provider may comprise a clock signal generator.

The mixer 330 translates the frequency selective impedance 320 in frequency by mixing it with the clock signal. For example, a low frequency high value impedance mixed with the transmit frequency will result in an impedance having a higher value at frequencies around the transmit frequency than at other frequencies. Similarly, a high frequency high value impedance mixed with the transmit frequency will result in an impedance having a lower value at frequencies around the transmit frequency than at other frequencies. Yet similarly, a band frequency high value impedance (with its frequency interval centered around the duplex distance) mixed with the transmit frequency will result in an impedance having a higher value at frequencies at duplex distance from the transmit frequency than at other frequencies.

The mixer 330 may be a passive mixer with the frequency selective impedance 320 at the IF port and clocked by the clock signal provider 310.

Figure 3B:
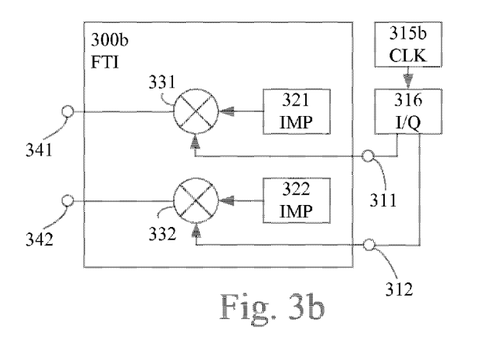

FIG. 3b illustrates a more detailed example of a frequency translated impedance (FTI) 300b according to some embodiments. In this example, the FTI comprises two frequency selective impedances 321 and 322 (typically having the same impedance values). As in FIG. 3a, the impedances has different values at different frequencies. The FTI also comprises a clock signal provider in the form of a clock signal input port comprising an in-phase input port 311 and a quadrature input port 312, and an IQ-mixer comprising an in-phase mixer 331 and a quadrature mixer 332. The clock signal provider 311, 312 is a IQ clock signal input port connected to a clock signal source 315b via an I/Q splitter 316 providing a 4-phase IQ clock signal. The outputs from the mixers 331 and 332 are provided as an IQ-signal to a connection node comprising an in-phase output port 341 and a quadrature input port 342.

Figure 4:
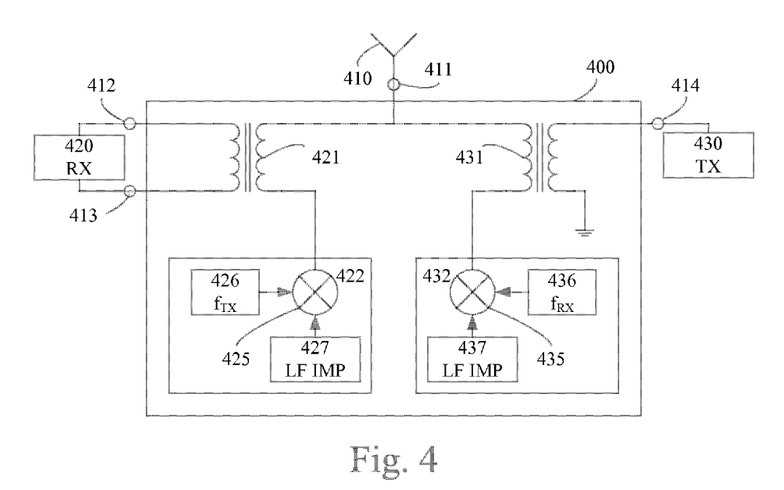
FIGS. 4-9 are schematic drawings illustrating example transceiver arrangements according to some embodiments.

FIG. 4 illustrates an example of a transceiver arrangement according to some embodiments. The transceiver arrangement of FIG. 4 comprises a receiver (RX) 420, a transmitter (TX) 430, an antenna 410 and a transceiver front-end 400. The antenna is connected to an antenna node 411 of the transceiver front-end, the transmitter is connected to a transmitter node 414 of the transceiver front-end, and the receiver is connected to two receiver nodes 412, 413 of the transceiver front-end (i.e. the receiver has a differential input).

The transceiver front-end 400 comprises a transmit frequency blocking arrangement and a receive frequency blocking arrangement.

The transmit frequency blocking arrangement comprises a transformer 421 and a frequency translated impedance (FTI) 422 connected to a second node of a first side of the transformer. A first node of the first side of the transformer is connected to the antenna node, a first node of a second side of the transformer is connected to one of the receiver nodes and a second node of the second side of the transformer is connected to the other receiver node. The FTI comprises a low frequency high value impedance (LF IMP) 427, a clock signal provider 426 providing a transmit frequency clock signal ($f_{TX}$), and a mixer 425. Thus, this FTI implementation has a high impedance at the transmit frequency and a low impedance otherwise (e.g. at the receive frequency). Hence, transmit signal leakage from the antenna and/or the transmitter will experience a high impedance 422. Thereby, the transformer will act as an open circuit and no (or a very limited) current will flow through the first side of the transformer 421 and blocking of transmit signals to the receiver is achieved. On the other hand, receive frequency signals will experience a low impedance 422 and the transformer will deliver the receive frequency signal to the receiver.

The receive frequency blocking arrangement comprises a transformer 431 and a frequency translated impedance (FTI) 432 connected to a second node of a first side of the transformer. A first node of the first side of the transformer is connected to the antenna node, a first node of a second side of the transformer is connected to the transmitter node and a second node of the second side of the transformer is connected to ground. The FTI comprises a low frequency high value impedance (LF IMP) 437, a clock signal provider 436 providing a receive frequency clock signal ($f_{RX}$), and a mixer 435. Thus, this FTI implementation has a high impedance at the receive frequency and a low impedance otherwise (e.g. at the transmit frequency). Hence, receive signal leakage from the antenna will experience a high impedance 432. Thereby, the transformer will act as an open circuit and no (or a very limited) current will flow through the first side of the transformer 431 and blocking of receive signals to the transmitter is achieved. Likewise, receive frequency noise generated by the transmitter will experience a high impedance 432. Thereby, no (or a very limited) current will flow through the first side of the transformer 431 and blocking of receive frequency noise from the transmitter is achieved. On the other hand, transmit frequency signals will experience a low impedance 432 and the transformer will deliver the transmit frequency signal to the antenna.

Looking into the circuit from the antenna node 411, the impedance at transmit frequency is low on the transmitter side and the transmitter transformer 431 is coupling transmit frequency signals from the transmitter to the antenna. On the other hand, looking into the circuit from the antenna node 411, the impedance at receive frequency is low on the receiver side and the receiver transformer 421 is coupling receive frequency signals from the antenna to the receiver.

Figure 5:
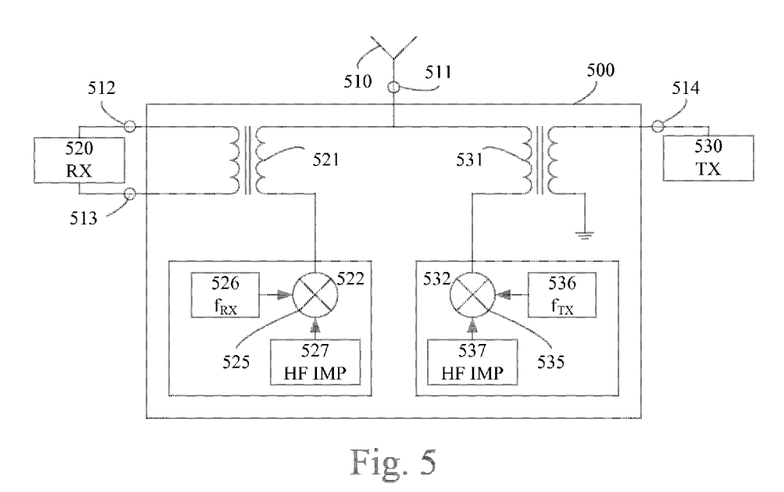

FIG. 5 illustrates an example of a transceiver arrangement according to some embodiments. The transceiver arrangement of FIG. 5 comprises a receiver (RX) 520, a transmitter (TX) 530, an antenna 510 and a transceiver front-end 500. The antenna is connected to an antenna node 511 of the transceiver front-end, the transmitter is connected to a transmitter node 514 of the transceiver front-end, and the receiver is connected to two receiver nodes 512, 513 of the transceiver front-end. The transceiver front-end 500 comprises a transmit frequency blocking arrangement and a receive frequency blocking arrangement.

The transmit frequency blocking arrangement comprises a transformer 521 and a frequency translated impedance (FTI) 522. The FTI comprises a high frequency high value impedance (HF IMP) 527, a clock signal provider 526 providing a receive frequency clock signal ($f_{RX}$), and a mixer 525. Thus, this FTI implementation has a low impedance at the receive frequency and a high impedance otherwise (e.g. at the transmit frequency). Hence, the FTI 522 functions similarly as the FTI 422 of FIG. 4 and the structure of the transmit frequency blocking arrangement is also similar to the one of FIG. 4.

The receive frequency blocking arrangement comprises a transformer 531 and a frequency translated impedance (FTI) 532. The FTI comprises a high frequency high value impedance (HF IMP) 537, a clock signal provider 536 providing a transmit frequency clock signal ($f_{TX}$), and a mixer 535. Thus, this FTI implementation has a low impedance at the transmit frequency and a high impedance otherwise (e.g. at the receive frequency). Hence, the FTI 535 functions similarly as the FTI 435 of FIG. 4 and the structure of the receive frequency blocking arrangement is also similar to the one of FIG. 4.

Figure 6:
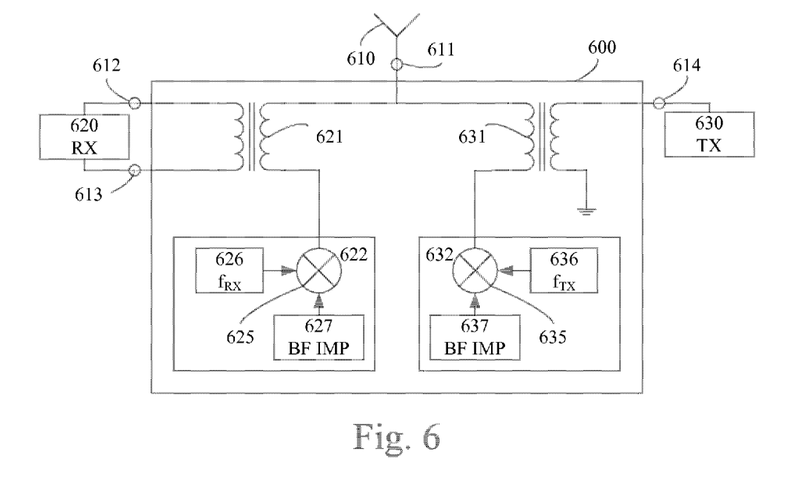

FIG. 6 illustrates an example of a transceiver arrangement according to some embodiments. The transceiver arrangement of FIG. 6 comprises a receiver (RX) 620, a transmitter (TX) 630, an antenna 610 and a transceiver front-end 600. The antenna is connected to an antenna node 611 of the transceiver front-end, the transmitter is connected to a transmitter node 614 of the transceiver front-end, and the receiver is connected to two receiver nodes 612, 613 of the transceiver front-end. The transceiver front-end 600 comprises a transmit frequency blocking arrangement and a receive frequency blocking arrangement.

The transmit frequency blocking arrangement comprises a transformer 621 and a frequency translated impedance (FTI) 622. The FTI comprises a band frequency high value impedance (BF IMP) 627 with high impedance at a frequency corresponding to the duplex distance, a clock signal provider 626 providing a receive frequency clock signal ($f_{RX}$), and a mixer 625. Thus, this FTI implementation has a high impedance at the transmit frequency and a low impedance otherwise (e.g. at the receive frequency). Hence, the FTI 622 functions similarly as the FTI 422 of FIG. 4 and the structure of the transmit frequency blocking arrangement is also similar to the one of FIG. 4.

The receive frequency blocking arrangement comprises a transformer 631 and a frequency translated impedance (FTI) 632. The FTI comprises a band frequency high value impedance (BF IMP) 637 with high impedance at a frequency corresponding to the duplex distance, a clock signal provider 636 providing a transmit frequency clock signal ($f_{TX}$), and a mixer 635. Thus, this FTI implementation has a high impedance at the receive frequency and a low impedance otherwise (e.g. at the transmit frequency). Hence, the FTI 635 functions similarly as the FTI 435 of FIG. 4 and the structure of the receive frequency blocking arrangement is also similar to the one of FIG. 4.

The band frequency high value impedances 622, 632 may, for example, be implemented by a parallel LC resonance tank.

Figure 7:
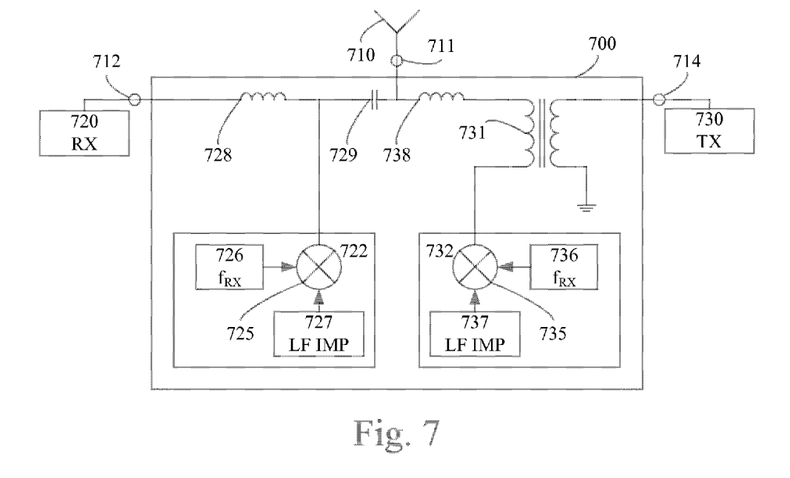

FIG. 7 illustrates an example of a transceiver arrangement according to some embodiments. The transceiver arrangement of FIG. 7 comprises a receiver (RX) 720, a transmitter (TX) 730, an antenna 710 and a transceiver front-end 700. The antenna is connected to an antenna node 711 of the transceiver front-end, the transmitter is connected to a transmitter node 414 of the transceiver front-end, and the receiver is connected to a receiver node 712 of the transceiver front-end (i.e. the receiver has a non-differential, or single-ended, input).

The transceiver front-end 700 comprises a transmit frequency blocking arrangement and a receive frequency blocking arrangement.

The receive frequency blocking arrangement comprises a transformer 731 and a frequency translated impedance (FTI) 732 connected to a second node of a first side of the transformer. A first node of the first side of the transformer is connected to the antenna node via an inductance 738, a first node of a second side of the transformer is connected to the transmitter node and a second node of the second side of the transformer is connected to ground. The FTI comprises a low frequency high value impedance (LF IMP) 737, a clock signal provider 736 providing a receive frequency clock signal ($f_{RX}$), and a mixer 735. Thus, this FTI implementation has a high impedance at the receive frequency and a low impedance otherwise (e.g. at the transmit frequency). Hence, the FTI 735 functions similarly as the FTI 435 of FIG. 4.

The transmit frequency blocking arrangement comprises a capacitance 729, an inductance 728 and a frequency translated impedance (FTI) 722. The capacitance 729 is connected between the antenna and the inductance 728, which in turn is connected between the capacitance 729 and the receiver node 712. The FTI is connected at a node between the capacitance 729 and the inductance 728. The FTI comprises a low frequency high value impedance (LF IMP) 727, a clock signal provider 726 providing a receive frequency clock signal ($f_{RX}$), and a mixer 725. Thus, this FTI implementation has a high impedance at the receive frequency and a low impedance otherwise (e.g. at the transmit frequency). Hence, transmit signal leakage from the antenna and/or the transmitter will experience a low impedance 722. Thereby, (almost) all current will flow through the impedance 722 and blocking of transmit signals to the receiver is achieved. On the other hand, receive frequency signals will experience a high impedance 722 and the current from the antenna will flow through the inductance 728, delivering the receive frequency signal to the receiver.

The inductance 738 and the capacitance 729 form an L-match network as seen from the transformer 731 of the receive frequency blocking arrangement and the components may be chosen to provide a band-pass filter associated with the transmit frequency. Hence, the transmitter signal to the antenna is filtered by this structure, thus attenuating the harmonic content of the transmitter signal. Some attenuation of receive frequency noise from the transmitter is also achieved. The inductance 728 and the capacitance 729 form a series resonance circuit. The components may be chosen so that the resonance frequency is the receive frequency to further simplify passage of receive frequency signals.

One advantage of this embodiment is that transmit frequency signal voltage across both of the FTIs 722 and 732 is kept at low values, reducing device voltage stress and simplifying mixer design.

Figure 8:
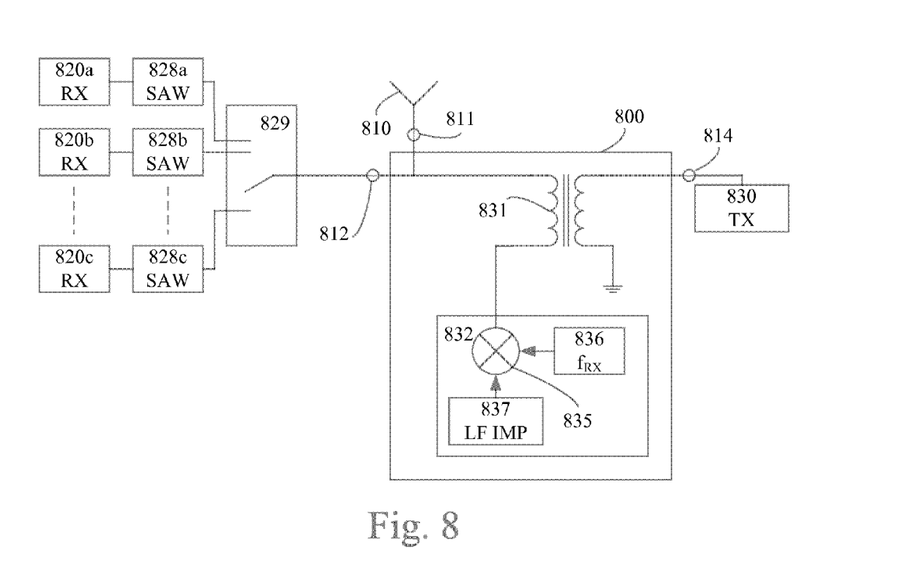

FIG. 8 illustrates an example of a transceiver arrangement according to some embodiments. The transceiver arrangement of FIG. 8 comprises a plurality of receivers (RX) 820a-c typically serving different frequency bands, a transmitter (TX) 830, an antenna 810 and a transceiver front-end 800. The antenna is connected to an antenna node 811 of the transceiver front-end, and the transmitter is connected to a transmitter node 814 of the transceiver front-end. The receivers are connected to a receiver node 812 of the transceiver front-end via respective SAW filters 828a-c and an antenna switch 829.

The transceiver front-end 800 comprises a receive frequency blocking arrangement.

The receive frequency blocking arrangement comprises a transformer 831 and a frequency translated impedance (FTI) 832 connected to a second node of a first side of the transformer. A first node of the first side of the transformer is connected to the antenna node, a first node of a second side of the transformer is connected to the transmitter node and a second node of the second side of the transformer is connected to ground. The FTI comprises a low frequency high value impedance (LF IMP) 837, a clock signal provider 836 providing a receive frequency clock signal ($f_{RX}$), and a mixer 835. Hence, the FTI 835 functions similarly as the FTI 435 of FIG. 4.

The transmit frequency blocking arrangement comprises the antenna switch 829 and the SAW-filters 828a-c. Thus, FIG. 8 illustrates an embodiment where a conventional solution is used for the transmit frequency blocking arrangement. The transceiver front-end 800 may be combined with any suitable known or future transmit frequency blocking arrangement.

One advantage with the implementation of FIG. 8 is that leakage towards the receiver at transmit frequency can be suppressed in the same order as with a conventional duplex filter, which may not be possible with the FTI construction for all duplex distances and frequency bands.

Figure 9:
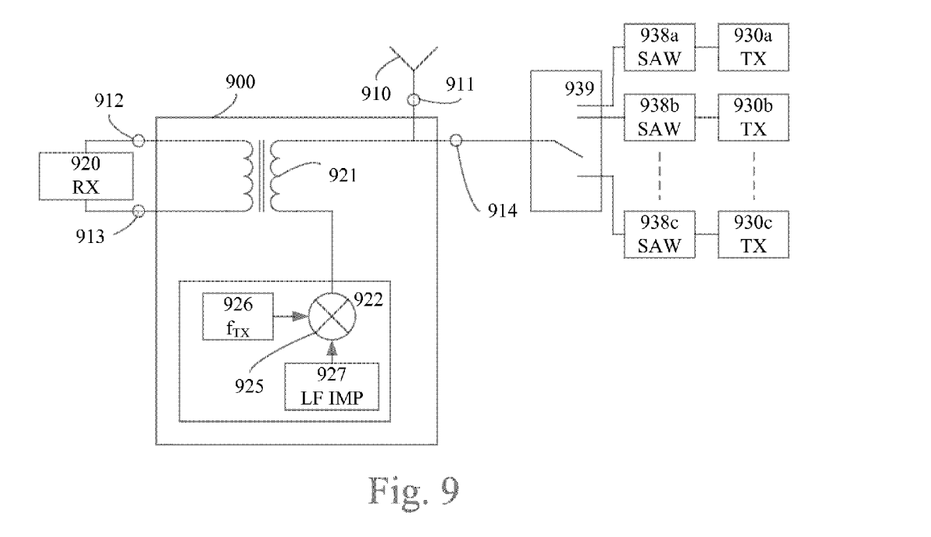

FIG. 9 illustrates an example of a transceiver arrangement according to some embodiments. The transceiver arrangement of FIG. 9 comprises a plurality of transmitters (TX) 930a-c typically serving different frequency bands, a receiver (RX) 920, an antenna 910 and a transceiver front-end 900. The antenna is connected to an antenna node 911 of the transceiver front-end, and the receiver is connected to two receiver nodes 912, 913 of the transceiver front-end. The transmitters are connected to a transmitter node 914 of the transceiver front-end via respective SAW filters 938a-c and an antenna switch 939.

The transceiver front-end 900 comprises a transmit frequency blocking arrangement.

The transmit frequency blocking arrangement comprises a transformer 921 and a frequency translated impedance (FTI) 922 connected to a second node of a first side of the transformer. A first node of the first side of the transformer is connected to the antenna node, a first node of a second side of the transformer is connected to one of the receiver nodes and a second node of the second side of the transformer is connected to the other receiver node. The FTI comprises a low frequency high value impedance (LF IMP) 927, a clock signal provider 926 providing a transmit frequency clock signal ($f_{TX}$), and a mixer 925. Hence, the FTI 922 functions similarly as the FTI 422 of FIG. 4.

The receive frequency blocking arrangement comprises the antenna switch 939 and the SAW-filters 938a-c. Thus, FIG. 9 illustrates an embodiment where a conventional solution is used for the receive frequency blocking arrangement. The transceiver front-end 900 may be combined with any suitable known or future receive frequency blocking arrangement.

One advantage with the implementation of FIG. 9 is that transmitter noise at receive frequency can be suppressed in the same order as with a conventional duplex filter, which may not be possible with the FTI construction for all duplex distances and frequency bands.

Some embodiments comprise combinations of the examples illustrated in FIG. 4-9. For example, the transmit frequency blocking arrangement of FIG. 6 may be combined with the receive frequency blocking arrangement of FIG. 4, the transmit frequency blocking arrangement of FIG. 4 may be combined with the receive frequency blocking arrangement of FIG. 6, etc.

In some embodiments, a transmit frequency blocking arrangement or a receive frequency blocking arrangement as described above may be combined with a receive frequency blocking arrangement or a transmit frequency blocking arrangement respectively, where the FTI is replaced by a filter arrangement adapted to have a higher impedance value in the blocking frequency interval than in the non-blocking frequency interval.

The filter arrangement may comprise a first inductance connected in parallel with a first capacitance to form a blocking frequency resonance arrangement.

The filter arrangement may further comprise at least one of a second inductance and a second capacitance connected in series with the blocking frequency resonance arrangement to form a non-blocking frequency resonance arrangement.

If the filter arrangement is a low pass filter arrangement, the filter arrangement comprises the second capacitance. If the filter arrangement is a high pass filter arrangement, the filter arrangement may comprise the second inductance.

Figure 10:
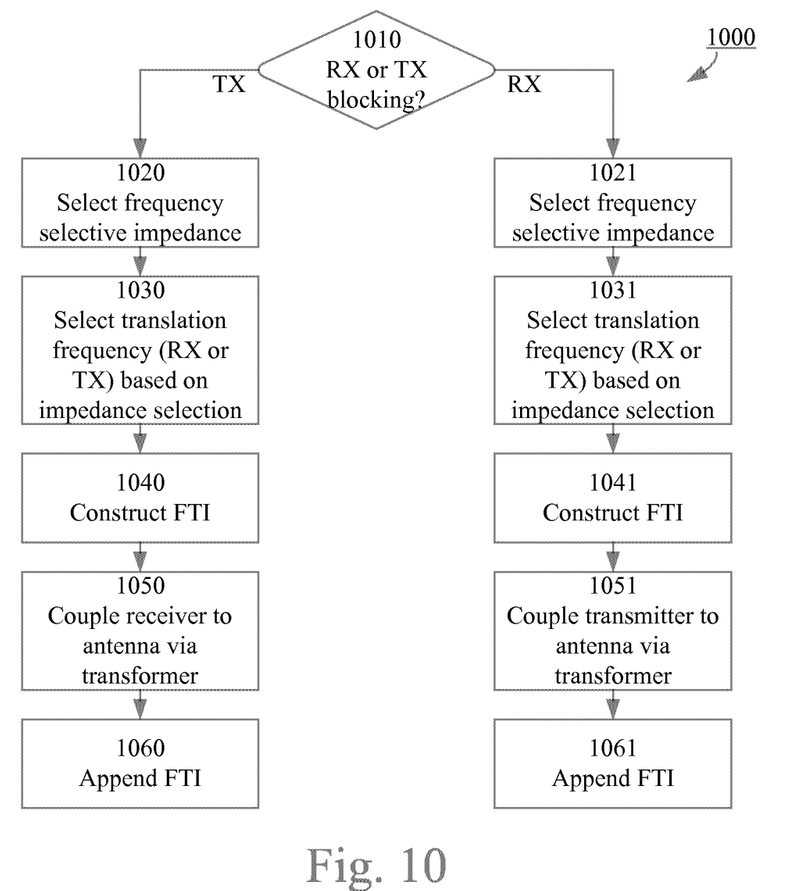
FIG. 10 is a flowchart illustrating example method steps according to some embodiments.

FIG. 10 illustrates an example method 1000 of blocking transmit and/or receive frequency signals according to some embodiments. The method starts in 1010, where it is determined whether it is transmit or receive frequency signals that are to be blocked.

If transmit frequency signals are to be blocked a suitable frequency selective impedance is selected in 1020 and a corresponding translation frequency is selected in 1030. In 1040, an FTI is constructed using the selected impedance, a clock signal provider having the translation frequency, and a mixer that translates the impedance using the translation frequency. The selections in 1020 and 1030 are related as has been exemplified above in connection to e.g. FIGS. 4-6 and may typically be chosen to provide an FTI with high impedance at transmit frequency and low impedance at receive frequency. In 1050, a signal transmission and reception arrangement (e.g. an antenna) is connected to a first node of a first side of a transformer and a receiver is connected to a first node of a second side of the transformer. The frequency translated impedance is connected to a second node of the first side of the transformer in 1060.

If receive frequency signals are to be blocked a suitable frequency selective impedance is selected in 1021 and a corresponding translation frequency is selected in 1031. In 1041, an FTI is constructed using the selected impedance, a clock signal provider having the translation frequency, and a mixer that translates the impedance using the translation frequency. The selections in 1021 and 1031 are related as has been exemplified above in connection to e.g. FIGS. 4-6 and may typically be chosen to provide an FTI with high impedance at receive frequency and low impedance at transmit frequency. In 1051, a signal transmission and reception arrangement (e.g. an antenna) is connected to a first node of a first side of a transformer and a receiver is connected to a first node of a second side of the transformer. The frequency translated impedance is connected to a second node of the first side of the transformer in 1061.

Other details of the method may be extracted from the transceiver embodiments described above.

The described embodiments and their equivalents may be realized in hardware. They may be performed by specialized circuits such as for example application-specific integrated circuits (ASIC), by discrete components, or by a combination thereof. All such forms are contemplated to be within the scope of the invention.

The invention may be embodied within an electronic apparatus (such as a wireless or wired communication device) comprising circuitry/logic according to any of the embodiments. The electronic apparatus may, for example, be a portable or handheld mobile radio communication equipment, a mobile radio terminal, a mobile telephone, a base station, a communicator, an electronic organizer, a smartphone, a computer, a notebook, or a mobile gaming device.

The invention has been described herein with reference to various embodiments. However, a person skilled in the art would recognize numerous variations to the described embodiments that would still fall within the scope of the invention. For example, the method embodiments described herein describes example methods through method steps being performed in a certain order. However, it is recognized that these sequences of events may take place in another order without departing from the scope of the invention. Furthermore, some method steps may be performed in parallel even though they have been described as being performed in sequence.

In the same manner, it should be noted that in the description of embodiments, the partition of functional blocks into particular units is by no means limiting to the invention. Contrarily, these partitions are merely examples. Functional blocks described herein as one unit may be split into two or more units. In the same manner, functional blocks that are described herein as being implemented as two or more units may be implemented as a single unit without departing from the scope of the invention.

Hence, it should be understood that the limitations of the described embodiments are merely for illustrative purpose and by no means limiting. Instead, the scope of the invention is defined by the appended claims rather than by the description, and all variations that fall within the range of the claims are intended to be embraced therein.

The invention claimed is:

1. A transceiver front-end of a communication device connectable:
   at a signal transmission and reception arrangement node to a signal transmission and reception arrangement configured to transmit a transmit signal having a transmit frequency and to receive a receive signal having a receive frequency;
   at one or more transmitter nodes to a transmitter configured to produce the transmit signal; and
   at one or more receiver nodes to a receiver configured to process the receive signal;
   the transceiver front-end comprising:
     a transmit frequency blocking arrangement, connected to the signal transmission and reception arrangement node and at least one of the transmitter nodes, having a blocking frequency interval associated with the transmit frequency and a non-blocking frequency interval associated with the receive frequency, and configured to block passage of transmit frequency signals between the signal transmission and reception arrangement and the receiver; and
     a receive frequency blocking arrangement, connected to the signal transmission and reception arrangement node and at least one of the receiver nodes, having a blocking frequency interval associated with the receive frequency and a non-blocking frequency interval associated with the transmit frequency, and configured to block passage of receive frequency signals between the signal transmission and reception arrangement and the transmitter;
   wherein at least one of the transmit frequency blocking arrangement and the receive frequency blocking arrangement comprises:
     a network of passive components comprising at least one transformer; and
     a frequency translated impedance configured to have a higher impedance value in the blocking frequency interval than in the non-blocking frequency interval; and
   wherein the signal transmission and reception arrangement node is connected to a first node of a first side of the transformer of the transmit frequency blocking arrangement or the receive frequency blocking arrangement:
     when connected to the first node of the first side of the transformer of the transmit frequency blocking arrangement, the frequency translated impedance of the transmit frequency blocking arrangement is a first frequency translated impedance and is connected to a second node of the first side of the transformer of the transmit frequency blocking arrangement, and a first node of the one or more receiver nodes is connected to a first node of the second side of the transformer of the transmit frequency blocking arrangement; and
     when connected to the first node of the first side of the transformer of the receive frequency blocking arrangement, the frequency translated impedance of the receive frequency blocking arrangement is a second frequency translated impedance and is connected to the second node of the first side of the transformer of the receive frequency blocking arrangement, and a first node of the one or more transmitter nodes is connected to a first node of the second side of the transformer of the receive frequency blocking arrangement.

2. The transceiver front-end of claim 1 wherein the frequency translated impedance comprises:
   a frequency selective impedance;
   a clock signal circuit configured to provide a clock signal; and
   a mixer circuit configured to translate the frequency selective impedance by mixing it with the clock signal.

3. The transceiver front-end of claim 2 wherein the frequency selective impedance of the receive frequency blocking arrangement is an impedance having higher impedance value at frequencies not exceeding a first threshold than at frequencies exceeding the first threshold and the clock signal has the receive frequency.

4. The transceiver front-end of claim 3 wherein the receive frequency blocking arrangement comprises a first inductance connected between the signal transmission and reception arrangement node and the first node of the first side of the transformer of the receive frequency blocking arrangement and wherein the transmit frequency blocking arrangement comprises:
   a capacitance connected to the signal transmission and reception arrangement node at a first node and configured to form a matching network for transmit signals with the first inductance;
   a second inductance connected between a second node of the capacitance and a first node of the one or more receiver nodes and configured to form a series resonance circuit for receive signals with the capacitance; and a frequency translated impedance connected to the second node of the capacitance and comprising a frequency selective impedance having higher impedance value at frequencies not exceeding a second threshold than at frequencies exceeding the second threshold, a clock signal circuit configured to provide a clock signal having the receive frequency and a mixer circuit configured to translate the frequency selective impedance by mixing it with the clock signal.

5. The transceiver front-end of claim 2 wherein the frequency selective impedance of the receive frequency blocking arrangement is an impedance having higher impedance value at frequencies exceeding a threshold than at frequencies not exceeding the threshold and the clock signal has the transmit frequency.

6. The transceiver front-end of claim 2 wherein the frequency selective impedance of the receive frequency blocking arrangement is an impedance having higher impedance value at frequencies in a first interval than at frequencies not in the first interval and the clock signal has the transmit frequency.

7. The transceiver front-end of claim 2 wherein the frequency selective impedance of the transmit frequency blocking arrangement is an impedance having higher impedance value at frequencies not exceeding a threshold than at frequencies exceeding the threshold and the clock signal has the transmit frequency.

8. The transceiver front-end of claim 2 wherein the frequency selective impedance of the transmit frequency blocking arrangement is an impedance having higher impedance value at frequencies exceeding a threshold than at frequencies not exceeding the threshold and the clock signal has the receive frequency.

9. The transceiver front-end of claim 2 wherein the frequency selective impedance of the transmit frequency blocking arrangement is an impedance having higher impedance value at frequencies in an interval than at frequencies not in the interval and the clock signal has the receive frequency.

10. A transceiver front-end connectable:
at a signal transmission and reception arrangement node to a signal transmission and reception arrangement configured to transmit a transmit signal having a transmit frequency and to receive a receive signal having a receive frequency;
at one or more transmitter nodes to a transmitter configured to produce the transmit signal; and
at one or more receiver nodes to a receiver configured to process the receive signal;
the transceiver front-end comprising:
a receive frequency blocking arrangement, connected to the signal transmission and reception arrangement node and at least one of the receiver nodes, having a blocking frequency interval associated with the receive frequency and a non-blocking frequency interval associated with the transmit frequency, and configured to block passage of receive frequency signals between the signal transmission and reception arrangement and the transmitter;
wherein the receive frequency blocking arrangement comprises:
a network of passive components comprising at least one transformer; and a frequency translated impedance configured to have a higher impedance value in the blocking frequency interval than in the non-blocking frequency interval; and
wherein the signal transmission and reception arrangement node is connected to a first node of a first side of the transformer of the receive frequency blocking arrangement, the frequency translated impedance of the receive frequency blocking arrangement is a first frequency translated impedance and is connected to a second node of the first side of the transformer of the receive frequency blocking arrangement, and a first node of the one or more transmitter nodes is connected to a first node of the second side of the transformer of the receive frequency blocking arrangement.

11. The transceiver front-end of claim 10 wherein the frequency translated impedance of the receive frequency blocking arrangement is configured to have a higher impedance value at the receive frequency than at the transmit frequency.

12. The transceiver front-end of claim 10 wherein the receive frequency blocking arrangement comprises a second frequency translated impedance connected to the first node of the second side of the transformer of the receive frequency blocking arrangement.

13. The transceiver front-end of claim 12 wherein a second node of the second side of the transformer of the receive frequency blocking arrangement is connected to one or more of:
a third frequency translated impedance; and
a second node of the one or more transmitter nodes.

14. The transceiver front-end of claim 10 wherein the frequency translated impedance comprises:
a frequency selective impedance;
a clock signal circuit configured to provide a clock signal; and
a mixer circuit configured to translate the frequency selective impedance by mixing it with the clock signal.

15. The transceiver front-end of claim 10 wherein the transceiver front-end is comprised in a transceiver or communication device comprising the transmitter and the receiver.

16. The transceiver of claim 15 further comprising the signal transmission and reception arrangement.

17. A transceiver front-end connectable:
at a signal transmission and reception arrangement node to a signal transmission and reception arrangement configured to transmit a transmit signal having a transmit frequency and to receive a receive signal having a receive frequency;
at one or more transmitter nodes to a transmitter configured to produce the transmit signal; and
at one or more receiver nodes to a receiver configured to process the receive signal;
the transceiver front-end comprising:
a transmit frequency blocking arrangement, connected to the signal transmission and reception arrangement node and at least one of the transmitter nodes, having a blocking frequency interval associated with the transmit frequency and a non-blocking frequency interval associated with the receive frequency, and configured to block passage of transmit frequency signals between the signal transmission and reception arrangement and the receiver; and
wherein the transmit frequency blocking arrangement comprises:

a network of passive components comprising at least one transformer; and a frequency translated impedance configured to have a higher impedance value in the blocking frequency interval than in the non-blocking frequency interval; and wherein the signal transmission and reception arrangement node is connected to a first node of a first side of the transformer of the transmit frequency blocking arrangement, the frequency translated impedance of the transmit frequency blocking arrangement is a first frequency translated impedance and is connected to a second node of the first side of the transformer of the transmit frequency blocking arrangement, and a first node of the one or more receiver nodes is connected to a first node of the second side of the transformer of the transmit frequency blocking arrangement.

18. The transceiver front-end of claim 17 wherein the frequency translated impedance of the transmit frequency blocking arrangement is configured to have a higher impedance value at the transmit frequency than at the receive frequency.

19. The transceiver front-end of claim 17 wherein the transmit frequency blocking arrangement comprises a second frequency translated impedance connected to the first node of the second side of the transformer of the transmit frequency blocking arrangement.

20. The transceiver front-end of claim 19 wherein a second node of the second side of the transformer of the transmit frequency blocking arrangement is connected to one or more of:
  a third frequency translated impedance; and
  a second node of the one or more receiver nodes.

21. The transceiver front-end of claim 17 wherein the frequency translated impedance comprises:
  a frequency selective impedance;
  a clock signal circuit configured to provide a clock signal; and
  a mixer circuit configured to translate the frequency selective impedance by mixing it with the clock signal.

22. The transceiver front-end of claim 17 wherein the transceiver front-end is comprised in a transceiver or communication device comprising the transmitter and the receiver.

23. The transceiver of claim 22 further comprising the signal transmission and reception arrangement.

24. A method of blocking transmit frequency signals from passage between a signal transmission and reception arrangement and a receiver of a communication device, comprising:
  constructing a frequency translated impedance comprising a frequency selective impedance, a mixer circuit and a clock signal circuit, wherein the frequency translated impedance has a higher impedance value at a transmit frequency than at a receive frequency;
  connecting the signal transmission and reception arrangement to a first node of a first side of a transformer of a receive frequency blocking arrangement and the receiver to a first node of a second side of the transformer; and
  connecting the frequency translated impedance to a second node of the first side of the transformer of the receive frequency blocking arrangement;
  wherein the receive frequency blocking arrangement, connected to at least one receiver node of the receiver, comprises the frequency translated impedance, has a blocking frequency interval associated with the receive frequency and a non-blocking frequency interval associated with the transmit frequency, and is configured to block passage of receive frequency signals between the signal transmission and reception arrangement and a transmitter; and
  wherein a first node of one or more transmitter nodes of the transmitter is connected to a first node of a second side of the transformer of the receive frequency blocking arrangement.

25. A method of blocking receive frequency signals from passage between a signal transmission and reception arrangement and a transmitter of a communication device, comprising:
  constructing a frequency translated impedance comprising a frequency selective impedance, a mixer circuit and a clock signal circuit, wherein the frequency translated impedance has a higher impedance value at a receive frequency than at a transmit frequency;
  connecting the signal transmission and reception arrangement to a first node of a first side of a transformer of a transmit frequency blocking arrangement and the transmitter to a first node of a second side of the transformer; and
  connecting the frequency translated impedance to a second node of the first side of the transformer of the transmit frequency blocking arrangement;
  wherein the transmit frequency blocking arrangement, connected to the signal transmission and reception arrangement node and at least one transmitter node, comprises the frequency translated impedance, has a blocking frequency interval associated with the transmit frequency and a non-blocking frequency interval associated with the receive frequency, and is configured to block passage of transmit frequency signals between the signal transmission and reception arrangement and a receiver; and
  wherein a first node of one or more receiver nodes of the receiver is connected to a first node of the second side of the transformer of the transmit frequency blocking arrangement.

* * * * *